US012555725B2

(12) United States Patent
Huang et al.

(10) Patent No.: US 12,555,725 B2
(45) Date of Patent: Feb. 17, 2026

(54) BUTTON STRUCTURE

(71) Applicant: AUO Corporation, Hsin-Chu (TW)

(72) Inventors: Chi-Chen Huang, Hsin-Chu (TW); Chiu-Lan Hsu, Hsin-Chu (TW); Jien-Feng Huang, Hsin-Chu (TW); Wu-Chang Tsai, Hsin-Chu (TW); Tzu-Chiang Cheng, Hsin-Chu (TW); Yi-Cheng Hsiao, Hsin-Chu (TW); I-Cheng Hung, Hsin-Chu (TW); Cheng-Wei Lee, Hsin-Chu (TW); Ya-Ke Yu, Hsin-Chu (TW); Ren-Mei Tseng, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 232 days.

(21) Appl. No.: 18/390,706

(22) Filed: Dec. 20, 2023

(65) Prior Publication Data

US 2025/0104937 A1 Mar. 27, 2025

(30) Foreign Application Priority Data

Sep. 27, 2023 (TW) ................................ 112137175

(51) Int. Cl.
*H01H 13/14* (2006.01)

(52) U.S. Cl.
CPC .................................. *H01H 13/14* (2013.01)

(58) Field of Classification Search
CPC ........... H01H 2013/00; H01H 2013/02; H01H 2013/50; H01H 2013/52; H01H 2205/00; H01H 2205/014; H01H 2215/00; H01H 2215/004; H01H 2215/006; H01H 2215/018; H01H 2221/00; H01H 3/00; H01H 3/02; H01H 3/12; H01H 5/00; H01H 5/04; H01H 5/06; H01H 13/00; H01H 13/02; H01H 13/12; H01H 13/14; H01H 13/18; H01H 13/20; H01H 13/22; H01H 13/26; H01H 13/50; H01H 13/52; H01H 2003/12

(Continued)

(56) References Cited

U.S. PATENT DOCUMENTS 7,332,688 B2 * 2/2008 Browne ................ B60K 35/10
200/341

FOREIGN PATENT DOCUMENTS

| | | | |
|---|---|---|---|
| CN | 21345915 | U | 6/2012 |
| CN | 107331561 | A | 11/2017 |
| CN | 211555752 | U | 9/2022 |

* cited by examiner

*Primary Examiner* — Anthony R Jimenez
(74) *Attorney, Agent, or Firm* — Tim Tingkang Xia, Esq.; Troutman Pepper Locke LLP

(57) ABSTRACT

A button structure includes a switch, a shell, an elastic member, a button and at least one adjustable limiting member. The elastic member includes a fixing portion, a compressive portion and an elastic portion. The fixing portion is connected to the shell. The compressive portion is configured to abut against the switch. The elastic portion is connected between the fixing portion and the compressive portion. The elastic portion is suitable for deformation. The button is connected to the compressive portion, and the compressive portion is located between the button and the switch. The adjustable limiting member is disposed on the button, and is configured to abut against the elastic portion. The adjustable limiting member adjustably protrudes for a length toward the elastic portion relative to the button.

10 Claims, 7 Drawing Sheets

(58) Field of Classification Search
USPC .......................................................... 200/341
See application file for complete search history.

BUTTON STRUCTURE

CROSS-REFERENCE TO RELATED PATENT APPLICATION

This non-provisional application claims priority to and the benefit of, pursuant to 35 U.S.C. § 119(a), patent application Serial No. 112137175 filed in Taiwan on Sep. 27, 2023. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to a button structure.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the living standards of people continue to rise, the importance of electronic products in their lives is increasing. Faced with the massive demand for the electronic products, major manufacturers are also striving to enhance the market competitiveness of their brands.

Specifically, in addition to enhancing the functionality and performance of the electronic products, improving the structural quality of electronic products while reducing production costs is undoubtedly a topic that various manufacturers attach great importance to.

SUMMARY

One of the objectives of the present disclosure is to provide a button structure, which may allow the user to simply and easily change the tactile feedback experienced when pressing the button.

According to one embodiment of the present disclosure, a button structure includes a switch, a shell, an elastic member, a button and at least one adjustable limiting member. The elastic member includes a fixing portion, a compressive portion and an elastic portion. The fixing portion is connected to the shell. The compressive portion is configured to abut against the switch. The elastic portion is connected between the fixing portion and the compressive portion. The elastic portion is suitable for deformation. The button is connected to the compressive portion, and the compressive portion is located between the button and the switch. The adjustable limiting member is disposed on the button, and is configured to abut against the elastic portion. The adjustable limiting member adjustably protrudes for a length toward the elastic portion relative to the button.

In one or more embodiments of the present disclosure, the adjustable limiting member is at least partially located between the button and the elastic portion.

In one or more embodiments of the present disclosure, the button structure includes at least one pair of adjustable limiting members, and the pair of adjustable limiting members are located at two opposite sides of the compressive portion and are symmetrical to each other.

In one or more embodiments of the present disclosure, the button has at least one through hole, and the adjustable limiting member includes a nut and a screw. The nut is disposed on the button and corresponds to the through hole. The screw includes a threaded rod and a screw head. The threaded rod passes through the through hole and is coupled to the nut. The screw head is connected to the threaded rod and is configured to abut against the elastic portion, and the screw head defines the length relative to the button.

In one or more embodiments of the present disclosure, the adjustable limiting member further includes a sheet material and a compressible pad. The sheet material has a first width, the screw head has a second width, and the first width is greater than the second width. The compressible pad is clamped between the sheet material and the button, and the sheet material and the compressible pad are clamped between the screw head and the button.

According to one embodiment of the present disclosure, a button structure includes a switch, a shell, an elastic member, a button and at least one adjustable limiting member. The elastic member includes a fixing portion, a compressive portion and an elastic portion. The fixing portion is connected to the shell. The compressive portion is configured to abut against the switch. The elastic portion is connected between the fixing portion and the compressive portion. The elastic portion is suitable for deformation. The button is connected to the compressive portion, and the compressive portion is located between the button and the switch. The adjustable limiting member is disposed on the shell, and is configured to abut against the elastic portion. The adjustable limiting member adjustably protrudes for a length toward the elastic portion relative to the shell.

In one or more embodiments of the present disclosure, the adjustable limiting member is at least partially located between the shell and the elastic portion.

In one or more embodiments of the present disclosure, the button structure includes at least one pair of adjustable limiting members. The pair of adjustable limiting members are located at two opposite sides of the compressive portion and are symmetrical to each other.

In one or more embodiments of the present disclosure, the shell has at least one through hole, and the adjustable limiting member includes a nut and a screw. The nut is disposed on the shell and corresponds to the through hole. The screw includes a threaded rod and a screw head. The threaded rod passes through the through hole and is coupled to the nut. The screw head is connected to the threaded rod and is configured to abut against the elastic portion, and the screw head defines the length relative to the shell.

In one or more embodiments of the present disclosure, the adjustable limiting member further includes a sheet material and a compressible pad. The sheet material has a first width, the screw head has a second width, and the first width is greater than the second width. The compressible pad is clamped between the sheet material and the shell, and the sheet material and the compressible pad are clamped between the screw head and the shell.

The embodiments of the present disclosure have at least the following advantages:

(1) The adjustable limiting member protrudes for a length toward the elastic portion. Thus, the deformation of the elastic portion is limited by the adjustable limiting member, such that the deformed shape of the elastic portion is limited, thereby changing the tactile feedback experienced by the user when pressing the button.

(2) The length of the adjustable limiting member protruding toward the elastic portion is adjustable. Thus, by adjusting the length protruding toward the elastic portion, the user may simply and easily experience the desired tactile feedback when pressing the button.

(3) By adjusting the length protruding toward the elastic portion, the user may simply and easily change the tactile feedback curve of the button structure.

These and other aspects of the present disclosure will become apparent from the following description of the embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
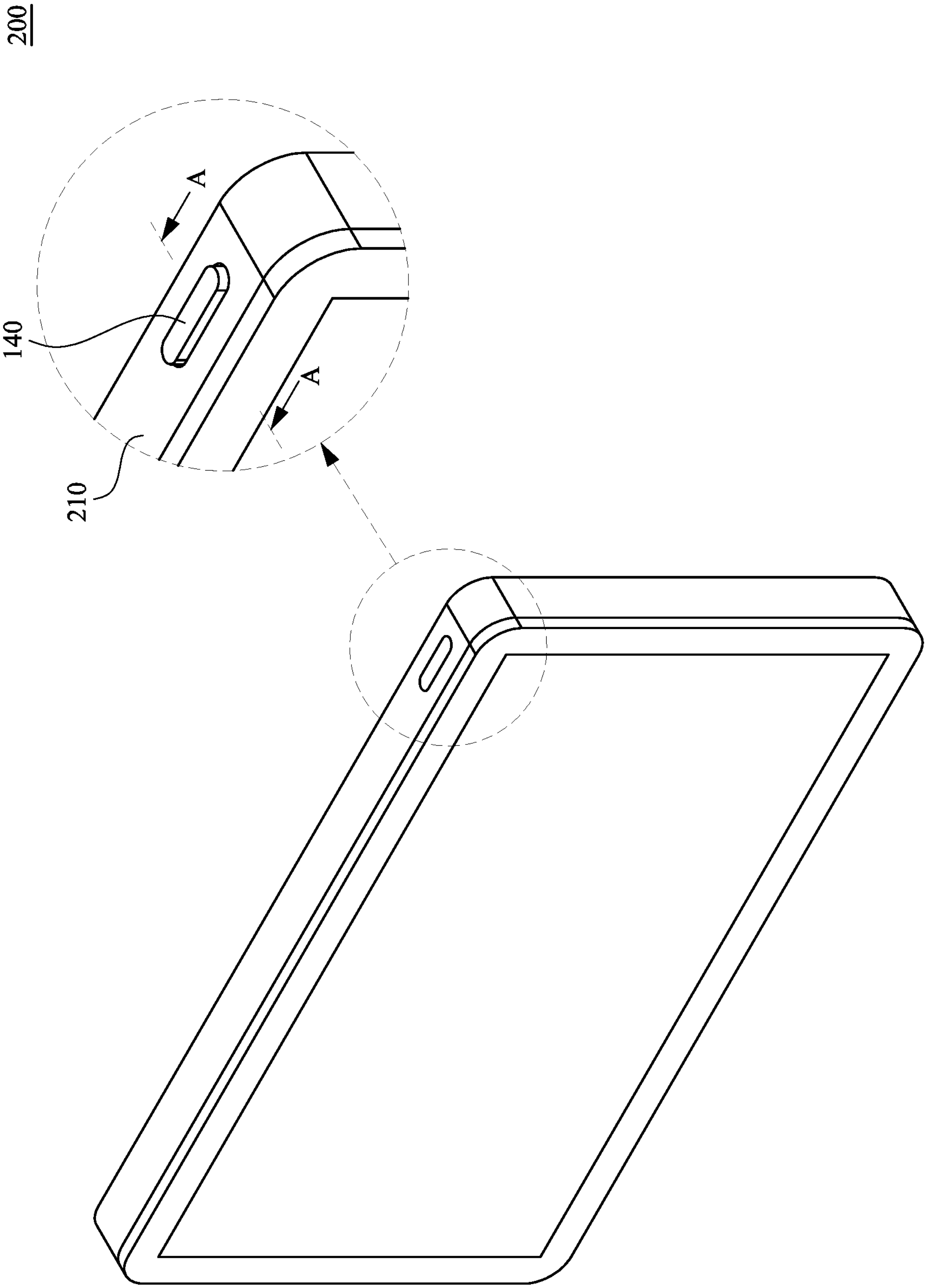
FIG. 1 is a perspective schematic view illustrating an electronic apparatus according to one embodiment of the present disclosure.

Multiple embodiments of the present disclosure will now be described hereinafter with reference to the accompanying drawings. For clarity, practical details will be described in the following descriptions. However, it should be understood that the practical details not are intended to limit the present disclosure. In other words, in certain embodiments of the present disclosure, the practical details may be unnecessary. In addition, to simplify the drawings, certain well-known structures and elements are illustrated in the drawings in a simplified schematic way. In the drawings, identical reference numerals refer to identical or like elements in the drawings and descriptions. If possible in implementation, the features in different embodiments may be mutually applied.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Referring to FIG. 1, FIG. 1 is a perspective schematic view illustrating an electronic apparatus 200 according to one embodiment of the present disclosure. In the present embodiment, as shown in FIG. 1, an electronic apparatus 200 may be, for example, an in-vehicle display or other commercial displays, which has a button 140 protruding from an outer shell 210 for a user to press thereon, thereby performing control of the electronic apparatus 200.

Figure 2:
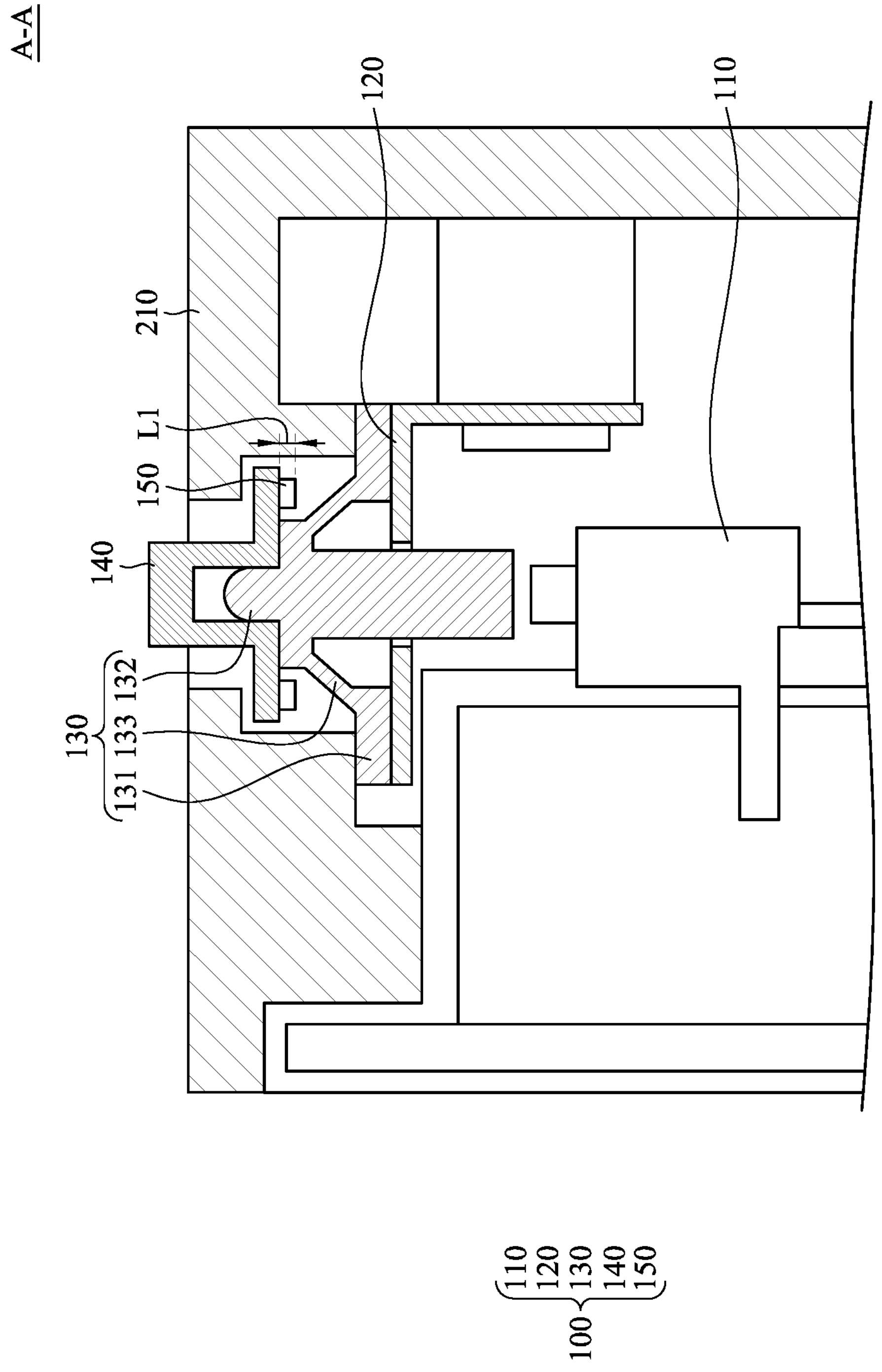
FIG. 2 is a sectional view illustrating FIG. 1 along the line A-A.

Referring to FIG. 2, FIG. 2 is a sectional view illustrating FIG. 1 along the line A-A. In the present embodiment, as shown in FIG. 2, a button structure 100 includes a switch 110, a shell 120, an elastic member 130, the button 140 and at least one adjustable limiting member 150. The elastic member 130 is made of an elastic material, such as rubber. The elastic member 130 includes a fixing portion 131, a compressive portion 132 and an elastic portion 133. The fixing portion 131 is connected to the shell 120, and the compressive portion 132 is configured to move toward the switch 110 in order to abut against the switch 110. The elastic portion 133 is connected between the fixing portion 131 and the compressive portion 132, and the elastic portion 133 is suitable for deformation, allowing the compressive portion 132 to move relative to the fixing portion 131. Specifically, the fixing portion 131, the compressive portion 132 and the elastic portion 133 may be integrally-formed structures. The button 140 is connected to the compressive portion 132 of the elastic member 130, and the compressive portion 132 is located between the button 140 and the switch 110. The button 140 is configured for the user to press thereon, such that the compressive portion 132 connected to the button 140 moves toward the switch 110 in order to abut against the switch 110 to turn on or turn off the switch 110. In the present embodiment, the adjustable limiting member 150 is disposed on the button 140, and is configured to abut against the elastic portion 133 of the elastic member 130, thereby limiting the position of the elastic portion 133. It should be noted that the adjustable limiting member 150 adjustably protrudes for a length L1 toward the elastic portion 133 relative to the button 140. That is, the length L1 is adjustable.

Further, in the present embodiment, as shown in FIG. 2, the adjustable limiting member 150 is at least partially located between the button 140 and the elastic portion 133 of the elastic member 130.

In practical applications, as shown in FIG. 2, the button structure 100 includes at least one pair of adjustable limiting members 150, and the pair of adjustable limiting members 150 are located at two opposite sides of the compressive portion 132 and are symmetrical to each other.

Figure 3:
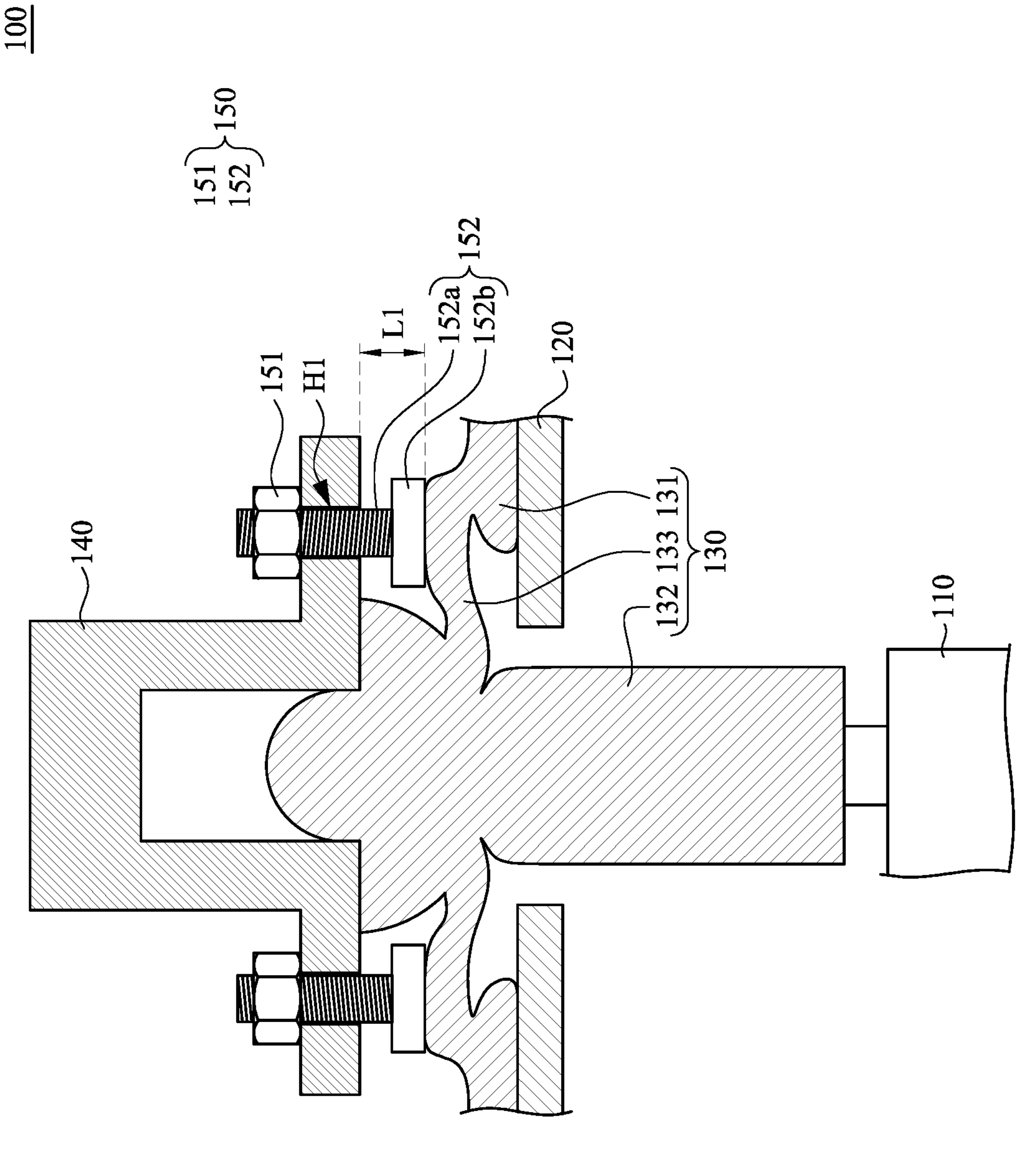
FIG. 3 is an enlarged sectional view illustrating the button structure of FIG. 2, where the button is compressed.

Referring to FIG. 3, FIG. 3 is an enlarged sectional view illustrating the button structure 100 of FIG. 2, where the button 140 is compressed. In the present embodiment, as shown in FIG. 3, the button 140 has at least one through hole H1. The adjustable limiting member 150 includes a nut 151 and a screw 152. The nut 151 is disposed on the button 140 and corresponds to the through hole H1. The screw 152 includes a threaded rod **152*a* and a screw head 152*b*. The threaded rod 152*a* passes through the through hole H1 and is coupled to the nut 151. The screw head 152*b* is connected to the threaded rod 152*a* and is configured to abut against the elastic portion 133 of the elastic member 130, thereby limiting the position of the elastic portion 133. The screw head 152***b* defines the length L1 relative to the button 140.

Specifically, as shown in FIG. 3, when the user presses on the button 140, the compressive 132 connected to the button 140 simultaneously moves toward the switch 110, and the elastic portion 133 correspondingly deforms. It should be noted that the adjustable limiting member 150 adjustably protrudes for a length L1 toward the elastic portion 133 relative to the button 140, and the adjustable limiting member 150 is at least partially located between the button 140 and the elastic portion 133. Thus, the deformation of the elastic portion 133 is limited by the screw head 152*b* of the adjustable limiting member 150, such that the deformed shape of the elastic portion 133 is limited, thereby changing the tactile feedback experienced by the user when pressing the button 140.

Further, the length L1 of the adjustable limiting member 150 protruding toward the elastic portion 133 relative to the button 140 is adjustable. Thus, by adjusting the length L1 protruding toward the elastic portion 133, such as rotating the screw 152 relative to the nut 151, the user may simply and easily experience the desired tactile feedback when pressing the button 140.

In other words, by adjusting the length L1 protruding toward the elastic portion 133, the user may simply and easily change the tactile feedback curve of the button structure 100, that is, the variation relationship of the travel of the button 140 relative to the force applied by the user when the user presses the button 140.

Figure 4:
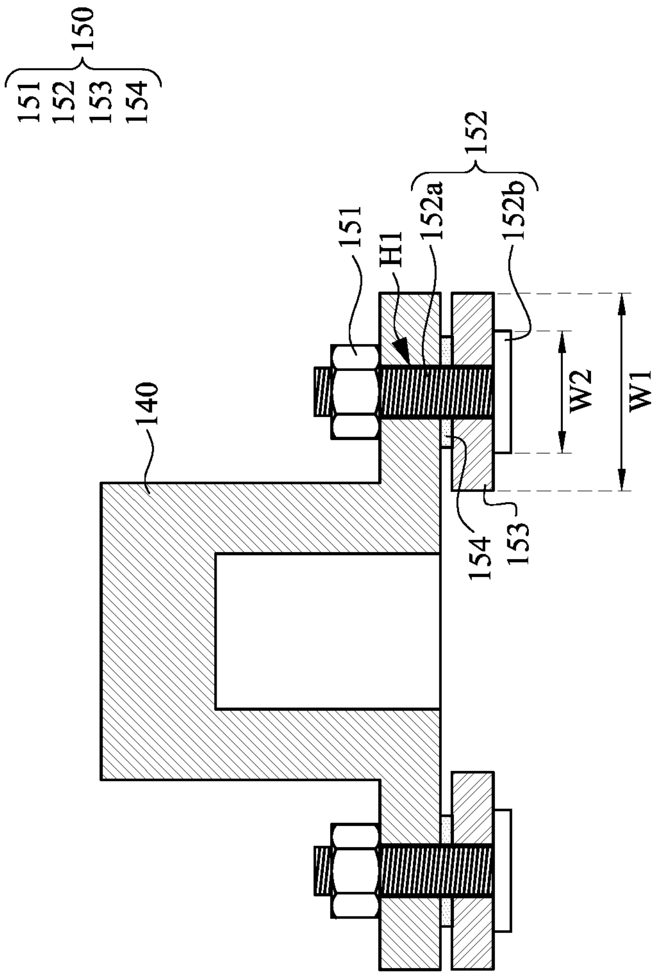
FIG. 4 is an enlarged sectional view illustrating an adjustable limiting member according to another embodiment of the present disclosure.

Referring to FIG. 4, FIG. 4 is an enlarged sectional view illustrating an adjustable limiting member 150 according to another embodiment of the present disclosure. In the present embodiment, as shown in FIG. 4, the adjustable limiting member 150 further includes a sheet material 153 and a compressible pad 154. The sheet material 153 has a first width W1, the screw head 152*b* has a second width W2, and the first width W1 of the sheet material 153 is greater than the second width W2 of the screw head 152*b*. The compressible pad 154 is clamped between the sheet material 153 and the button 140, and the sheet material 153 and the compressible pad 154 are clamped between the screw head 152*b* and the button 140.

Figure 5:
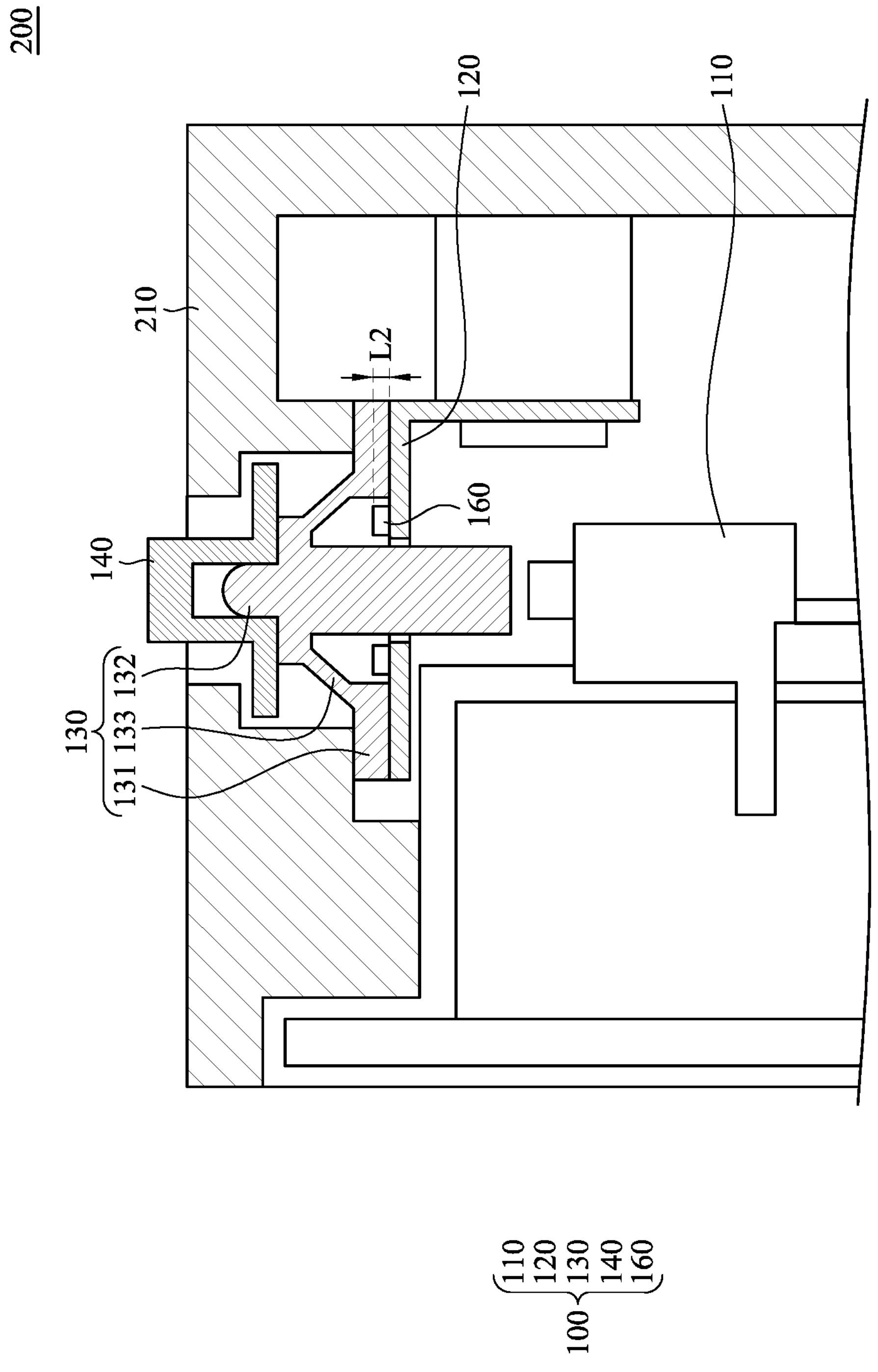
FIG. 5 is a partial enlarged sectional view illustrating an electronic apparatus according to yet another embodiment of the present disclosure.

Referring to FIG. 5, FIG. 5 is a partial enlarged sectional view illustrating an electronic apparatus 200 according to yet another embodiment of the present disclosure. In the present embodiment, as shown in FIG. 2, a button structure 100 includes a switch 110, a shell 120, an elastic member 130, the button 140 and at least one adjustable limiting member 160. The elastic member 130 is made of an elastic material, such as rubber. The elastic member 130 includes a fixing portion 131, a compressive portion 132 and an elastic portion 133. The fixing portion 131 is connected to the shell 120. The compressive portion 132 is configured to move toward the switch 110 in order to abut against the switch 110. The elastic portion 133 is connected between the fixing portion 131 and the compressive portion 132, and the elastic portion 133 is suitable for deformation, allowing the compressive portion 132 to move relative to the fixing portion 131. Specifically, the fixing portion 131, the compressive portion 132 and the elastic portion 133 may be integrally-formed structures. The button 140 is connected to the compressive portion 132 of the elastic member 130, and the compressive portion 132 is located between the button 140 and the switch 110. The button 140 is configured for the user to press thereon, such that the compressive portion 132 connected to the button 140 moves toward the switch 110 in order to abut against the switch 110 to turn on or turn off the switch 110. In the present embodiment, the adjustable limiting member 160 is disposed on the shell 120, and is configured to abut against the elastic portion 133 of the elastic member 130, thereby limiting the position of the elastic portion 133. It should be noted that the adjustable limiting member 160 adjustably protrudes for a length L2 toward the elastic portion 133 relative to the shell 120. That is, the length L2 is adjustable.

Further, in the present embodiment, as shown in FIG. 5, the adjustable limiting member 160 is at least partially located between the shell 120 and the elastic portion 133 of the elastic member 130.

In practical applications, as shown in FIG. 5, the button structure 100 includes at least one pair of adjustable limiting members 160, and the pair of adjustable limiting members 160 are located at two opposite sides of the compressive portion 132 and are symmetrical to each other.

Figure 6:
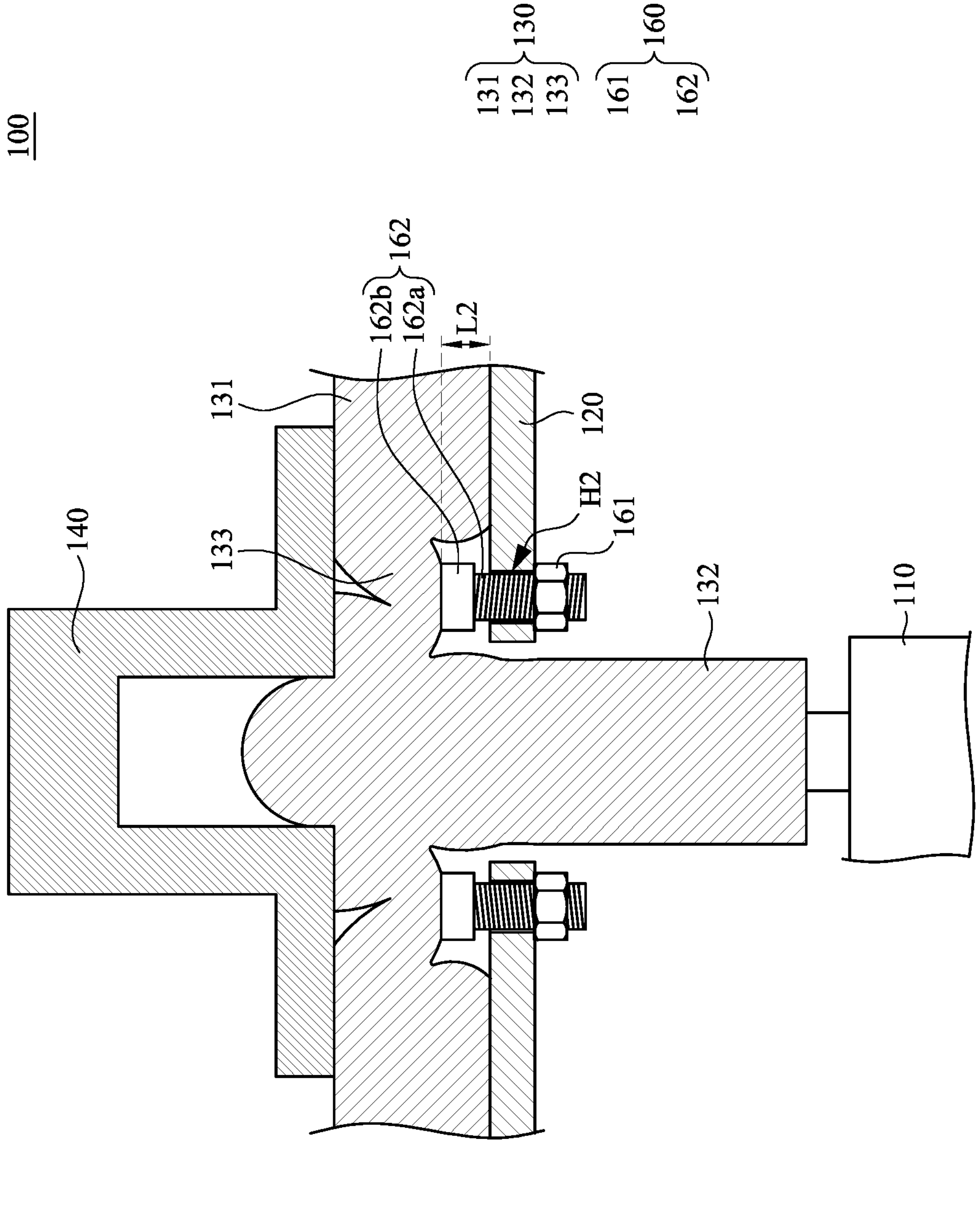
FIG. 6 is an enlarged sectional view illustrating the button structure of FIG. 5, where the button is compressed.

Referring to FIG. 6, FIG. 6 is an enlarged sectional view illustrating the button structure 100 of FIG. 5, where the button 140 is compressed. In the present embodiment, as shown in FIG. 6, the shell 120 has at least one through hole H2. The adjustable limiting member 160 includes a nut 161 and a screw 162. The nut 161 is disposed on the shell 120 and corresponds to the through hole H2. The screw 162 includes a threaded rod 162*a* and a screw head 162*b*. The threaded rod 162*a* passes through the through hole H2 and is coupled to the nut 161. The screw head 162*b* is connected to the threaded rod 162*a* and is configured to abut against the elastic portion 133 of the elastic member 130, thereby limiting the position of the elastic portion 133. The screw head 162*b* defines the length L2 relative to the shell 120.

Specifically, as shown in FIG. 6, when the user presses on the button 140, the compressive 132 connected to the button 140 simultaneously moves toward the switch 110, and the elastic portion 133 correspondingly deforms. It should be noted that the adjustable limiting member 160 adjustably protrudes for a length L2 toward the elastic portion 133 relative to the shell 120, and the adjustable limiting member 160 is at least partially located between the shell 120 and the elastic portion 133. Thus, the deformation of the elastic portion 133 is limited by the screw head 162*b* of the adjustable limiting member 160, such that the deformed shape of the elastic portion 133 is limited, thereby changing the tactile feedback experienced by the user when pressing the button 140.

Further, the length L2 of the adjustable limiting member 160 protruding toward the elastic portion 133 relative to the shell 120 is adjustable. Thus, by adjusting the length L2 protruding toward the elastic portion 133, such as rotating the screw 162 relative to the nut 161, the user may simply and easily experience the desired tactile feedback when pressing the button 140.

In other words, by adjusting the length L2 protruding toward the elastic portion 133, the user may simply and easily change the tactile feedback curve of the button structure 100, that is, the variation relationship of the travel of the button 140 relative to the force applied by the user when the user presses the button 140.

Figure 7:
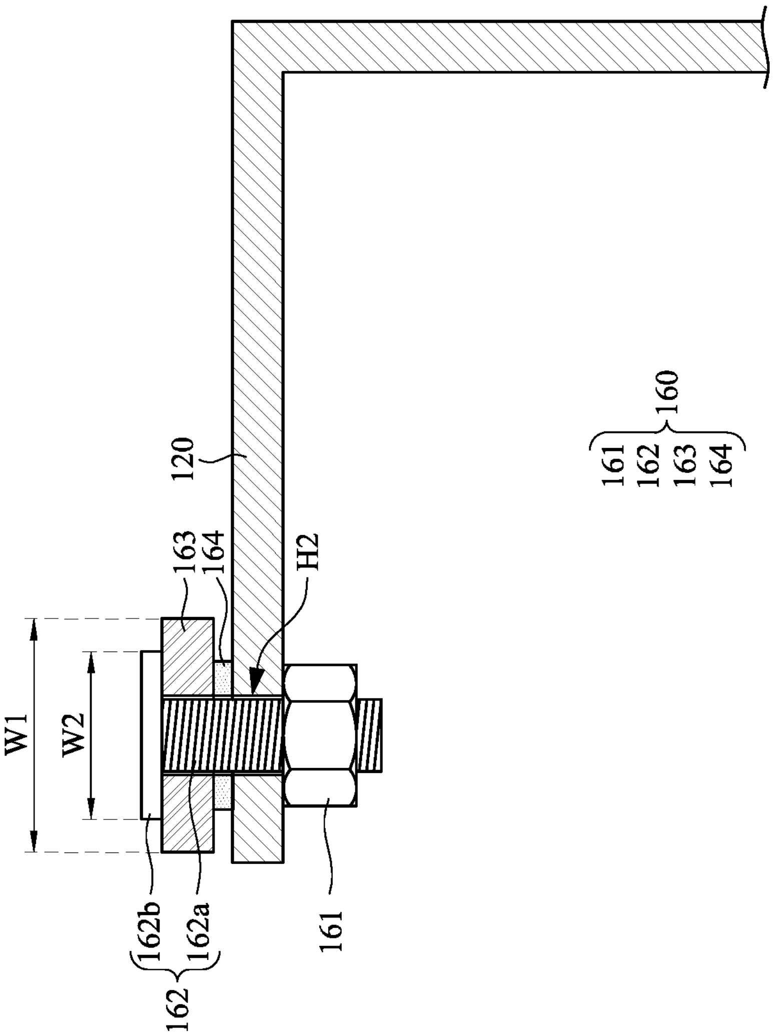
FIG. 7 is an enlarged sectional view illustrating an adjustable limiting member according to a further embodiment of the present disclosure.

Referring to FIG. 7, FIG. 7 is an enlarged sectional view illustrating an adjustable limiting member according to a further embodiment of the present disclosure. In the present embodiment, as shown in FIG. 7, the adjustable limiting member 160 further includes a sheet material 163 and a compressible pad 164. The sheet material 163 has a first width W1, the screw head 162*b* has a second width W2, and the first width W1 of the sheet material 163 is greater than the second width W2 of the screw head 162*b*. The compressible pad 164 is clamped between the sheet material 163 and the shell 120, and the sheet material 163 and the compressible pad 164 are clamped between the screw head 162*b* and the shell 120.

In sum, the technical solutions disclosed in the embodiments of the present disclosure at least have the following advantages:

(1) The adjustable limiting member protrudes for a length toward the elastic portion. Thus, the deformation of the elastic portion is limited by the adjustable limiting member, such that the deformed shape of the elastic portion is limited, thereby changing the tactile feedback experienced by the user when pressing the button.

(2) The length of the adjustable limiting member protruding toward the elastic portion is adjustable. Thus, by adjusting the length protruding toward the elastic portion, the user may simply and easily experience the desired tactile feedback when pressing the button.

(3) By adjusting the length protruding toward the elastic portion, the user may simply and easily change the tactile feedback curve of the button structure.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A button structure, comprising:
a switch;
a shell;
an elastic member, comprising:
a fixing portion, connected to the shell;
a compressive portion, configured to abut against the switch; and
an elastic portion, connected between the fixing portion and the compressive portion, wherein the elastic portion is configured to deform;
a button, connected to the compressive portion, wherein the compressive portion is located between the button and the switch; and
at least one adjustable limiting member, disposed on the button, and configured to abut against the elastic portion, wherein the at least one adjustable limiting member adjustably protrudes for a length toward the elastic portion relative to the button.

2. The button structure according to claim 1, wherein the at least one adjustable limiting member is at least partially located between the button and the elastic portion.

3. The button structure according to claim 1, wherein the at least one adjustable limiting member comprises at least one pair of adjustable limiting members, wherein the at least one pair of adjustable limiting members are located at two opposite sides of the compressive portion and are symmetrical to each other.

4. The button structure according to claim 1, wherein the button has at least one through hole, and the at least one adjustable limiting member comprises:
a nut, disposed on the button and corresponding to the at least one through hole; and
a screw, comprising:
a threaded rod, passing through the at least one through hole and coupled to the nut; and
a screw head, connected to the threaded rod and configured to abut against the elastic portion, wherein the screw head defines the length relative to the button.

5. The button structure according to claim 4, wherein the at least one adjustable limiting member further comprises:
a sheet material, wherein the sheet material has a first width, the screw head has a second width, and the first width is greater than the second width; and
a compressible pad, clamped between the sheet material and the button, wherein the sheet material and the compressible pad are clamped between the screw head and the button.

6. A button structure, comprising:
a switch;
a shell;
an elastic member, comprising:
a fixing portion, connected to the shell;
a compressive portion, configured to abut against the switch; and
an elastic portion, connected between the fixing portion and the compressive portion, wherein the elastic portion is configured to deform;
a button, connected to the compressive portion, wherein the compressive portion is located between the button and the switch; and
at least one adjustable limiting member, disposed on the shell, and configured to abut against the elastic portion, wherein the at least one adjustable limiting member adjustably protrudes for a length toward the elastic portion relative to the shell.

7. The button structure according to claim 6, wherein the at least one adjustable limiting member is at least partially located between the shell and the elastic portion.

8. The button structure according to claim 6, wherein the at least one adjustable limiting member comprises at least one pair of adjustable limiting members, wherein the at least one pair of adjustable limiting members are located at two opposite sides of the compressive portion and are symmetrical to each other.

9. The button structure according to claim 6, wherein the shell has at least one through hole, and the at least one adjustable limiting member comprises:
a nut, disposed on the shell and corresponding to the at least one through hole; and
a screw, comprising:
a threaded rod, passing through the at least one through hole and coupled to the nut; and
a screw head, connected to the threaded rod and configured to abut against the elastic portion, wherein the screw head defines the length relative to the shell.

10. The button structure according to claim 9, wherein the at least one adjustable limiting member further comprises:
a sheet material, wherein the sheet material has a first width, the screw head has a second width, and the first width is greater than the second width; and a compressible pad, clamped between the sheet material and the shell, wherein the sheet material and the compressible pad are clamped between the screw head and the shell.

* * * * *